(12) United States Patent
Izumi

(10) Patent No.: US 8,681,182 B2
(45) Date of Patent: Mar. 25, 2014

(54) ALTERNATE VIEWPOINT RENDERING

(75) Inventor: Kuniaki Izumi, Burbank, CA (US)

(73) Assignee: Deluxe 3D LLC, Hollywood, CA (US)

( * ) Notice: Subject to any disclaimer, the term of this patent is extended or adjusted under 35 U.S.C. 154(b) by 402 days.

(21) Appl. No.: 13/089,537

(22) Filed: Apr. 19, 2011

(65) Prior Publication Data
US 2012/0268499 A1    Oct. 25, 2012

(51) Int. Cl.
*G06T 1/60* (2006.01)
*G06T 19/00* (2011.01)

(52) U.S. Cl.
USPC .......................................... 345/682; 345/419

(58) Field of Classification Search
None
See application file for complete search history.

(56) References Cited

U.S. PATENT DOCUMENTS

| | | | | |
|---|---|---|---|---|
| 5,953,014 | A * | 9/1999 | Wood | 345/422 |
| 6,088,006 | A | 7/2000 | Tabata | |
| 6,417,850 | B1 * | 7/2002 | Kang | 345/422 |

| | | | |
|---|---|---|---|
| 2009/0115780 | A1 | 5/2009 | Varekamp et al. |
| 2010/0007661 | A1 | 1/2010 | Kim et al. |
| 2011/0018863 | A1 | 1/2011 | Ha |

OTHER PUBLICATIONS

International Search Report and Written Opinion for PCT/US2012/034129 mailed Nov. 28, 2012.

* cited by examiner

*Primary Examiner* — Kee M Tung
*Assistant Examiner* — Sing-Wai Wu
(74) *Attorney, Agent, or Firm* — Fitch, Even, Tabin & Flannery LLP

(57) ABSTRACT

Described are computer-based methods and apparatuses, including computer program products, for alternate viewpoint rendering. A first image and a set of pixel-shift values for the pixels in the first image are received. A portion of a second image is generated, the second image comprising a different viewpoint than a viewpoint of the first image. A first pixel from the set of pixels is selected based on the different viewpoint. A first destination pixel is identified for the first pixel in the second image based on a pixel-shift value from the set of pixel-shift values associated with the first pixel. A value of the first destination pixel is determined based on at least one of (a) a previously considered pixel from the set of pixels of the first image that is horizontally adjacent to the first pixel or (b) the pixel-shift value associated with the first pixel.

16 Claims, 9 Drawing Sheets

US 8,681,182 B2

ALTERNATE VIEWPOINT RENDERING

FIELD OF THE INVENTION

The present invention relates generally to computer-based methods and apparatuses, including computer program products, for alternate viewpoint rendering.

BACKGROUND

Rendering is often used to refer to a process of taking a model (for example, a three-dimensional (3D) model or an image-based model) and producing from an abstract set of data (e.g., lighting information, texture information, 3D object information, prospective and parallax information) a visual image that is a representation of that data. Rendering is often used to render alternate (or different) viewpoints of an original image. For example, an original image can be rendered into two images that simulate the left and right images that would be perceived by a person's eyes (a stereo pair). Advantageously this process can be used to create synthetic stereopsis (or artificially triggered stereo depth perception).

For a geometric system, an image (or movie) can be rendered using models generated for characters in the image (e.g., computer graphics (CG) models). In some examples, actual physical models can be made (e.g., out of plaster). The models do not need any surface or texture, etc., because the image or movie can be projected onto the model, which provides the proper context (e.g., the blank face of the model will take on the texture and context projected onto it). The projection can also be done virtually inside a CG model system to create the geometry. The models can be moved to approximate the position of the characters on screen. The scene and/or characters are projected onto the model(s), and alternate viewpoints can be generated from different vantage points of the models.

For an image-based approach, conceptually the process is similar to that for a geometric system, but the geometry is not actually built. For example, the geometry in a geometric system is used to show where the light is traveling to and stopping. For a face, light that hits the nose stops at a certain distance, and light that hits the cheek stops at a distance further into the scene than the light impinging upon the nose. Therefore, in the geometric system, geometry is built that interrupts the projected light and indicates where the light lands. In an image-based approach, depth information (such as depth mattes) can be generated without building the actual geometry. The depth information is then used to render alternate viewpoints of the original image.

In the field of motion pictures, it is often cumbersome to shoot a film with two cameras for stereo presentation. Further, there is a large catalog of existing films and television that were created from only one viewpoint. Stereo conversion allows filmmakers to shoot with one camera and achieve the stereo effect as a post-process. However, rendering techniques often suffer from both delays in processing speed and in the accuracy of which the alternate viewpoint images (the rendered images) are generated. For example, if it takes too long to generate stereo pairs from source images, it becomes impracticable to render sequences of original images (e.g., movies). Further, while the images can be filtered to speed up the process, the alternate viewpoint images may suffer from excessive distortion. This distortion can compromise the viewing pleasure of the rendered sequences, which results in a poor viewer experience.

SUMMARY OF THE INVENTION

One approach to generate alternate viewpoints is to use a two phase process that first renders the original images (based on depth information such as depth mattes) and fills smaller gaps, and a second phase that fills the remaining larger gaps. The order of pixels processed can be customized to enhance efficiency. For example, it can be beneficial to process pixels from the original image from left-to-right in some instances (e.g., to render an image with a viewpoint that is left of the original viewpoint in the source image), or to process pixels from the original image from right-to-left in other instances (e.g., to render an image with a viewpoint that is right of the original viewpoint in the source image). Further, the top-most pixels can be kept track of to avoid performing unnecessary computation and processing.

In one embodiment, a computerized method is featured. The computerized method includes receiving, by a computing device, (a) a first image including a set of pixels and (b) a set of pixel-shift values for the set of pixels, each pixel-shift value including data indicative of a change in location of a corresponding pixel from the set of pixels from an original pixel location in the first image. The computerized method includes generating, by the computing device, a portion of a second image, the second image including a different viewpoint than a viewpoint of the first image. Generating includes selecting, by the computing device, a first pixel from the set of pixels based on the different viewpoint. Generating includes identifying, by the computing device, a first destination pixel for the first pixel in the second image based on a pixel-shift value from the set of pixel-shift values associated with the first pixel. Generating includes determining, by the computing device, a value of the first destination pixel based on at least one of (a) a previously considered pixel from the set of pixels of the first image that is horizontally adjacent to the first pixel or (b) the pixel-shift value associated with the first pixel.

In another embodiment, an apparatus including a processor and memory is featured. The apparatus is configured to receive (a) a first image including a set of pixels and (b) a set of pixel-shift values for the set of pixels, each pixel-shift value including data indicative of a change in location of a corresponding pixel from the set of pixels from an original pixel location in the first image. The apparatus is configured to generate a portion of a second image, the second image including a different viewpoint than a viewpoint of the first image. Generating includes selecting a first pixel from the set of pixels based on the different viewpoint. Generating includes identifying a first destination pixel for the first pixel in the second image based on a pixel-shift value from the set of pixel-shift values associated with the first pixel. Generating includes determining a value of the first destination pixel based on at least one of (a) a previously considered pixel from the set of pixels of the first image that is horizontally adjacent to the first pixel or (b) the pixel-shift value associated with the first pixel.

In another embodiment, a computer program product, tangibly embodied in a non-transitory computer readable medium, is featured. The computer program product including instructions being configured to cause a data processing apparatus to receive (a) a first image including a set of pixels and (b) a set of pixel-shift values for the set of pixels, each pixel-shift value including data indicative of a change in location of a corresponding pixel from the set of pixels from an original pixel location in the first image. The computer program product including instructions being configured to cause a data processing apparatus to generate a portion of a second image, the second image including a different viewpoint than a viewpoint of the first image. Generating includes selecting a first pixel from the set of pixels based on the different viewpoint. Generating includes identifying a first destination pixel for the first pixel in the second image based on a pixel-shift value from the set of pixel-shift values associated with the first pixel. Generating includes determining a value of the first destination pixel based on at least one of (a) a previously considered pixel from the set of pixels of the first image that is horizontally adjacent to the first pixel or (b) the pixel-shift value associated with the first pixel.

In another embodiment, an apparatus includes a means for receiving (a) a first image including a set of pixels and (b) a set of pixel-shift values for the set of pixels, each pixel-shift value including data indicative of a change in location of a corresponding pixel from the set of pixels from an original pixel location in the first image. The means generates a portion of a second image, the second image including a different viewpoint than a viewpoint of the first image. Generating includes selecting a first pixel from the set of pixels based on the different viewpoint. Generating includes identifying a first destination pixel for the first pixel in the second image based on a pixel-shift value from the set of pixel-shift values associated with the first pixel. Generating includes determining a value of the first destination pixel based on at least one of (a) a previously considered pixel from the set of pixels of the first image that is horizontally adjacent to the first pixel or (b) the pixel-shift value associated with the first pixel.

In other examples, any of the aspects above can include one or more of the following features. Determining can include determining the value of the first destination pixel based on a value of the previously considered pixel and a destination pixel for the previously considered pixel in the second image. The different viewpoint of the second image can be left of the viewpoint of the first image, the method further including considering pixels in the set of pixels from the first image from left to right. The different viewpoint of the second image can be right of the viewpoint of the first image, the method further including considering pixels in the set of pixels from the first image from right to left.

In some examples, determining the value of the first destination pixel includes determining a pixel gap between the first destination pixel and a destination pixel of the previously considered pixel, the gap including a set of pixels, and if the pixel gap is less than a threshold gap size, setting the pixel value for each pixel in the set of pixels of the pixel gap equal to the previously considered pixel. Identifying the first destination pixel can include identifying the first destination pixel based on an integer portion of the pixel-shift value associated with the first pixel, and determining the value of the first destination pixel can include determining the value based on (a) both the first pixel and the previously considered pixel and (b) a decimal portion of the pixel-shift value associated with the first pixel.

In other examples, the pixel-shift value associated with the first pixel can be an integer number, and determining includes setting the value of the first destination pixel equal to the first pixel. Determining the value of the first destination pixel can include determining the value of the first destination pixel was previously determined based on the previously considered pixel, the previously considered pixel having a larger shift than a shift of the first pixel, and not changing the value of the first destination pixel based on the first pixel. The previously considered pixel can be closer to a viewer than the first pixel such that the previously considered pixel obscures the first pixel from the viewer.

In some examples, a second pixel is selected that is horizontally adjacent to the first pixel and the previously considered pixel, a second destination pixel is identified for the second pixel in the second image based on an associated pixel-shift value from the set of pixel-shift values, wherein the second destination pixel is horizontally adjacent to the first destination pixel, and a value of the second destination pixel is set based on the first pixel, the second pixel, and the pixel-shift value associated with the second pixel.

In other examples, a set of pixel gaps in the second image is identified, wherein each pixel gap in the set of pixel gaps is greater than a threshold gap size, and values for pixels in each pixel gap of the set of pixel gaps are determined. A pixel gap from the set of pixel gaps can be selected, which of a left pixel horizontally adjacent to a left side of the pixel gap and a right pixel horizontally adjacent to a right side of the pixel gap has a lowest depth can be determined based on the different viewpoint, and values for pixels in the pixel gap can be determined based on the lowest of the left pixel and the right pixel.

In some examples, data indicative of a pixel shift value for the second image is received, and each pixel in the second image can be shifted based on the pixel shift value. The set of pixel-shift values can be calculated based on depth information for the set of pixels of the first image. The depth information can include a depth matte including a depth value for each pixel in the first image.

The techniques, which include both methods and apparatuses, described herein can provide one or more of the following advantages. Images with different viewpoints of the same original scene can be efficiently and accurately rendered to achieve synthetic stereopsis. One set of pixel-shift values can be created to render a left image of a stereo pair, and the pixel-shift values can be negated to create a symmetric pair of images around the original image. Pixels from the original image can be rendered based on the viewpoint difference from the original image (e.g., from left-to-right for a rendered image that has a viewpoint left of the original viewpoint). The renderer can keep track of the top pixels, which can computationally save time by not needing to compare the actual depth of pixels when rendering the image. For example, a larger shift implies a more foreground object, so a destination location that is filled by a previously considered pixel must have shifted farther than a currently considered pixel. Therefore, if the previous pixel shifted more, it must be closer to the viewer. If it is closer to the viewer, it will obscure any other pixel. The order that the pixels are placed can eliminate the need to explicitly compare pixel depth. Further, excessive filtering for the alternate viewpoint generation can be minimized to retain more of the source material's characteristics.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other aspects, features, and advantages of the present invention, as well as the invention itself, will be more fully understood from the following description of various embodiments, when read together with the accompanying drawings.

DETAILED DESCRIPTION

In general, computerized systems and methods are provided for generating images with alternate viewpoints from an original image. Depth information (e.g., a depth matte) is generated for the original image. Pixel-shift values that indicate how to transform the depth information into an image (e.g., an image displayed in the real world) are generated based on the depth information. The pixel-shift values and the original image are used to generate the alternate viewpoint images.

Although the specification and/or figures describe(s) the techniques in terms of particular ordered steps, these techniques work equally as well using different orders for the steps (and/or different steps) and are therefore not intended to limit the computerized systems and methods described herein.

Figure 1:
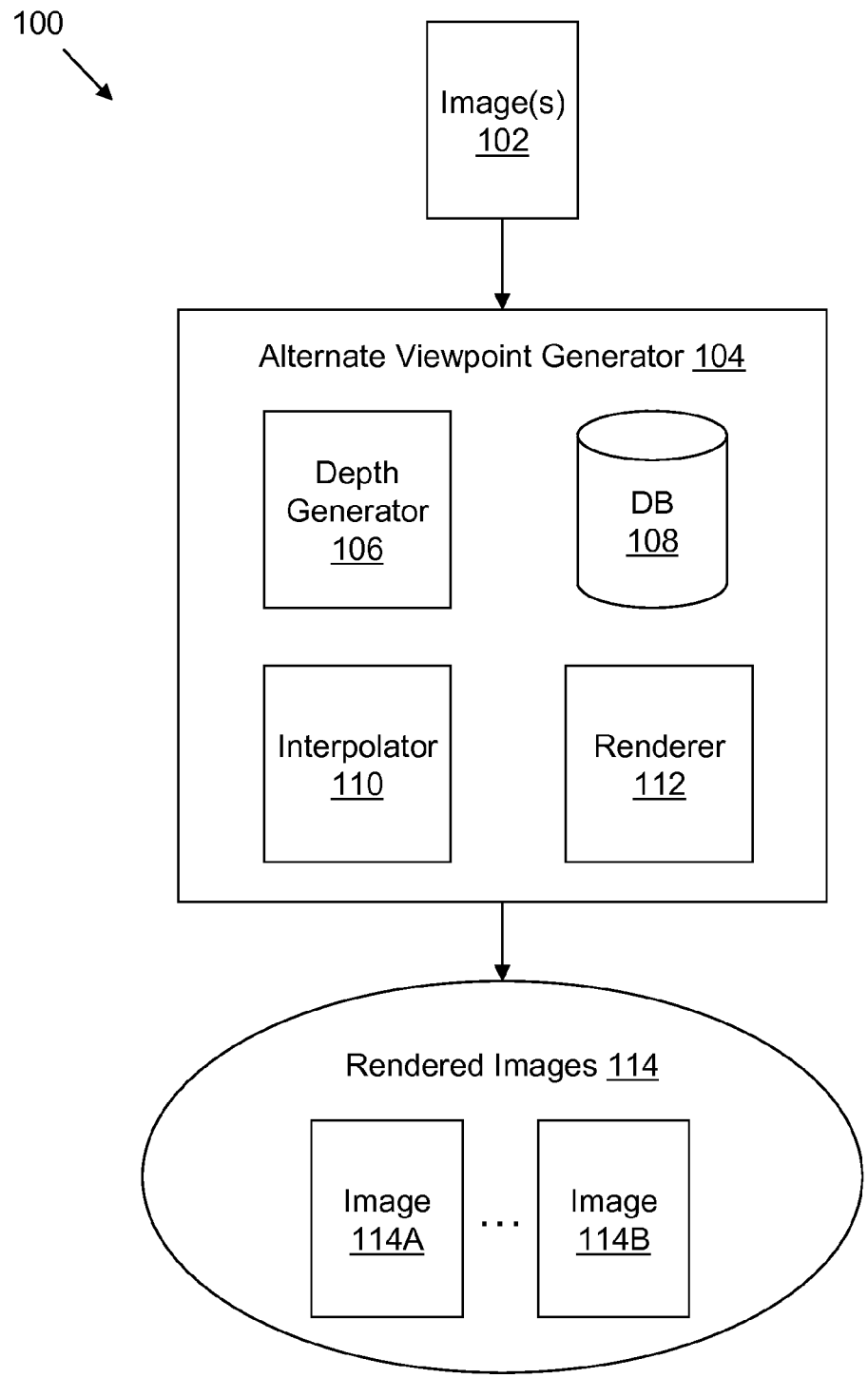
FIG. 1 is a diagram that illustrates a computerized system in which an alternate viewpoint generator converts an original image into one or more rendered images according to one embodiment.

FIG. 1 is a diagram that illustrates a computerized system 100 in which an alternate viewpoint generator 104 (also referred to herein as "generator 104") converts an original (or source) image into one or more rendered images according to one embodiment. The generator 104 receives original image 102 and generates a set of rendered images 114 based on the original image 102. Each rendered image has a different viewpoint than the viewpoint of the original image 102. The rendered images 114 include image 114A through image 114B. While FIG. 1 depicts only one original image 102, in some embodiments a plurality of images 102 are input to the generator 104. For example, the generator 104 can stereo convert a movie (e.g., stereo convert a movie originally filmed in 2D into a 3D movie). Similarly, while FIG. 1 depicts at least two rendered images 114A and 114B, in some embodiments the generator 104 only generates one image based on an original image 102, or the generator 104 generates three or more images based on the original image 102.

The generator 104 includes a depth generator 106, a database 108, an interpolator 110, and a render 112. In some embodiments, the generator 104 converts the original image 102 (or a plurality of images) using a two step conversion process. First, the depth generator 106 generates depth information (e.g., a depth matte) and/or other control data based on the original image 102. Second, the renderer 112 renders the original image 102, the depth information and/or other control data (e.g., pixel-shift values calculated by the interpolator 110) to produce two or more rendered images 114 (e.g., 114A and 114B) from alternate viewpoints of the viewpoint of the original image 102 (e.g., for binocular viewing). In some embodiments, the original image is used as one image for a stereo pair, and only the second image of the stereo pair is rendered from the original image.

The depth generator 106 generates depth information from the original image 102. The depth generator 106 can capture, analytically determine, or render the depth information. The depth generator 106 can receive depth information that was generated synthetically by artists (e.g., or by a combination of these techniques).

In some embodiments, the depth generator 106 generates a depth matte for the original image. In a depth matte, depth information is often stored in an image where the color or luminance value for each pixel encodes a depth value for the associated pixel in the original image, with darker values representing objects further into the scene and lighter values representing objects closer to the viewer. For example, a depth matte can be a grayscale representation of the original image 102. For example, each pixel in the depth matte can have a luminance value between zero to one, where a value of one indicates the corresponding pixel in the original image 102 is closest to a viewer, and where a value of zero indicates the corresponding pixel in the original image 102 is furthest away from the viewer.

The depth generator 106 can create the depth matte using a variety of techniques. In some examples, the depth generator 106 segments the original image 102 into smaller pieces that define sub-components (e.g., characters and objects in the original image 102). The depth generator 106 can then apply depth information to these sub-components (e.g., to pass to the interpolator 110 and/or renderer 112). In some examples, the image segmentation process and depth assignment processes is performed using computer-executed software that automatically analyzes an image or sequence of images to generate the depth matte. In some examples, the generation is an iterative process, where the software generates a solution and then receives corrected input (if any) from an operator (e.g., to create the sub-components and/or the depth values).

The database 108 can be any type of data storage device (e.g., hard drive or solid state memory) that the alternate viewpoint generator 104 uses to store data. The data can include, for example, stored control parameters that the alternate viewpoint generator 104 uses to determine pixel-shift values and/or to render images (e.g., rendered images 114).

The interpolator 110 calculates pixel-shift values for each pixel in the original image 102. For digital images encoded in pixels (e.g., original image 102), a pixel-shift value is indicative of the magnitude of the change in location of a pixel from the original image to a different image with a different viewpoint than the viewpoint of the original image. For example, an original image can be considered to have a viewpoint of zero degrees off-center. An alternate image can have a different viewpoint of the same scene (e.g., objects, characteristics, etc.) than that of the original image. For example, alternate viewpoint(s) can be five degrees to the left from center, ten degrees to the right from center, etc. The pixel-shift values for an alternate viewpoint (e.g., for ten degrees left of center) indicates the magnitude of the actual pixel shifts (the change in location) for each pixel necessary to generate the alternate viewpoint.

In various applications, the differences in the pixel locations of the alternate viewpoints are what the brain perceives through stereopsis. For example, to a human, objects appear slightly differently to the left and right eyes. Those differences are combined in the brain of the observer who perceives one view with stereo depth. Advantageously, by presenting images with different viewpoints of the same original scene, synthetic stereopsis can be achieved by creating two (or more) views of a scene to trigger stereo depth perception upon viewing.

The interpolator 110 can determine pixel-shift values using one or more different techniques. In some embodiments, the interpolator 110 can use depth information for each pixel (e.g., a depth matte or other depth information). The interpolator 110 calculates the pixel-shift values to indicate how to present in spatial depth (e.g., in reality) the pixels of the original image based on the depth information. The spatial depth represents distance relative to a property of the original image. For example, the spatial depth can represent the distance from a viewer or a distance relative to the convergence plane. For example, the depth information may not represent perceivable information to a viewer in the real world. Therefore, the interpolator 110 calculates a mapping to indicate how to transform the pixels in the original image 102 to an image with a different viewpoint by defining the pixel-shift values for each pixel in the original image. The spatial depth can represent the distance from the observer or a distance relative to something else. For example, the spatial depth can represent the distance from the convergence plane of the original image. A convergence plane is, for example, the focus point of the original image (e.g., if a camera that captured the original image was focused on a bottle on a desk, the convergence point is at the bottle).

The interpolator 110 can linearly generate the pixel-shift values (e.g., to map the depth information to spatial depth). In some embodiments, the interpolator generates the pixel-shift values linearly based on luminance value for each pixel (e.g., each luminance value has a 1-1 mapping to a pixel-shift value). For example, the interpolator assigns a pixel-shift value for each pixel based on a mapping of depth matte values. For example, the interpolator 110 assigns a pixel-shift value of 5 to a depth matte luminance value of 0, a pixel-shift value of −4 to a depth matte luminance value of 1, and any luminance values between 0 to 1 are shifted linearly. Advantageously, the interpolator 110 can arbitrarily look at a depth matte value and assign a pixel-shift value for the associated pixel in the original image.

In some embodiments, the interpolator 110 does not linearly generate the pixel-shift values. For example, the interpolator 110 can interpret depth information values into real distance. The interpolator 110 can be configured to interpret a depth matte more in terms of real space rather than linearly based on luminance value. For example, optics and/or physics can be incorporated into algorithms that interpret depth information as if viewed through a lens to calculate pixel-shift values.

The interpolator 110 can use look-up-tables (e.g., that are stored in database 108) and/or perform other algorithmic manipulation to determine the pixel-shift values (e.g., during encoding of a depth matte while creating it, or while using (or interpreting) the depth matte). For example, look-up tables or algorithms can be configured to force certain luminance values to be closer or further away than other luminance values.

As an example, the interpolator 110 can be configured to define luminance values in a depth matte within the range of 0 to 0.5 linearly, and to define luminance values between 0.5 to 1 to be closer to a viewer than they would normally be rendered (e.g., luminance values near 0.5 can be made to behave like luminance values near 0.75). Similarly, the interpolator 110 can be configured to interpolate luminance values between 0 to 0.5 to be further away from a viewer than they would normally be rendered (e.g., luminance values between 0.2 to 0.3 can be made to behave like 0.2). Advantageously, instead of only interpreting depth information linearly, the interpolator 110 can be configured to interpret the depth information in different ways (e.g., to make objects far away from a viewer appear even further away, or to compress closer objects to the viewer).

The interpolator 110 can calculate the pixel-shift values based on various information. In some embodiments, the interpolator 110 calculates the pixel-shift values using an image-based model, where the pixel shift is computed directly from depth matte values and control parameters. In some embodiments, the interpolator 110 calculates the pixel shift values using a lens based model where the pixel shift is computed from the depth matte values, control parameters and lens information that may mimic how the original image was captured. For example, the lens information can be obtained by projecting the original image data from the film plane through a synthetic lens that matches the characteristics of the original imaging system. The original image data projects into the environment to an appropriate depth and is observed from different viewpoints through a similar synthetic lens. In some examples, the complex optics of physical lenses can be replaced with a pinhole camera model to simplify computation complexity.

Figure 2:
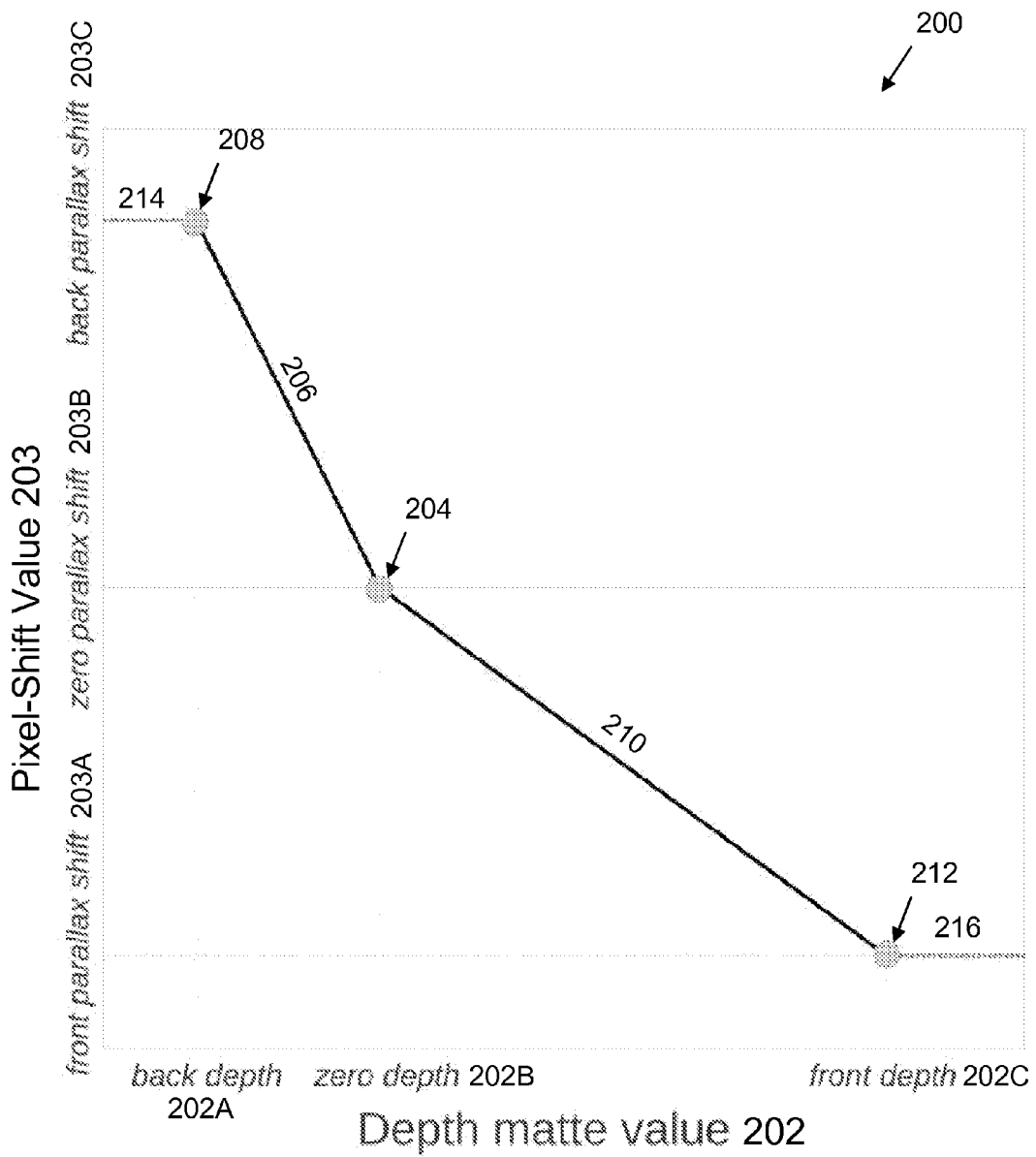
FIG. 2 is a diagram that illustrates calculation of pixel-shift values based on depth matte values according to one embodiment.

In some embodiments, the interpolator 110 calculates the pixel-shift values from depth-matte values along two linear segments. FIG. 2 is a diagram 200 that illustrates calculation of pixel-shift values 203 based on depth matte values 202 according to one embodiment. A zero depth-matte value 202B is chosen for zero parallax shift at 203B indicated at point 204, which has zero depth and zero parallax shift (a zero pixel-shift value). For pixels in the original image associated with a depth matte value equal to zero depth 202B, the pixels are not shifted when generating the alternate viewpoint image (e.g., the pixels are placed in the same location for the alternate viewpoint image, as is described further below). Depth matte values that are darker than the zero depth matte value 202B shift the associated pixels from the original image linearly according to line 206 to a back (e.g., far from the viewer) parallax shift value 203C at a back depth-matte value 202A as indicated by point 208 (e.g., a value of zero). Depth matte values that are lighter than the zero depth value 202B shift linearly along line 210 to a front (e.g., near the viewer) depth matte value 202C with a front parallax shift value 203A, shown by point 212. FIG. 2 also includes two outside boundaries 214, 216.

In some embodiments, the interpolator 110 determines a pixel-shift value 203 for each pixel in the original image based on depth matte values 202 for each pixel. If a depth matte value is less than the back depth matte value 202A (e.g., and therefore falls within boundary 214), the pixel-shift value for the associated pixel is set to the back parallax shift value 203C. If a depth matte value falls between the back depth matte value 202A and the zero depth matte value 202B, the pixel-shift value for the associated pixel is calculated based on Equation 1:

$$S = (D - Z\_depth) * B\_shift / (B\_depth - Z\_depth) \qquad \text{Equation 1}$$

where:

D = the depth matte value being analyzed by the interpolator 110;

Z_depth = the zero depth matte value 202B;

B_shift = the back parallax shift 203C;

B_depth = the back depth matte value 202A; and

S = the pixel-shift value for the pixel associated with the depth matte value.

If a depth matte value falls between the zero depth matte value 202B and the front depth matte value 202C, the pixel-shift value for the associated pixel is calculated based on Equation 2:

$$S=(D-Z\_depth)*F\_shift/(F\_depth-Z\_depth) \quad \text{Equation 2}$$

where:
D=the depth matte value being analyzed by the interpolator 110;
Z_depth=the zero depth matte value 202B;
F_shift=the front parallax shift 203A;
F_depth=the front depth matte value 202C; and
S=the pixel-shift value for the pixel associated with the depth matte value.

If a depth matte value is greater than the front depth matte value 202C (e.g., and therefore falls within boundary 216), the pixel-shift value for the associated pixel is set to the front parallax shift value 203A.

In some embodiments, if the generator 104 is generating two rendered images 114 based on an original image 102 (e.g., two images that have left and right viewpoints of the original image 102), the interpolator can use the same depth values and negate the pixel-shift values. For example, the interpolator 110 can calculate pixel-shift values for an image with a left viewpoint to the viewpoint of the original image 102, and negate the calculated pixel-shift values (e.g., a pixel shift value of 1 is negated to −1) to create pixel-shift values for the a right image. Advantageously, negating the pixel-shift values creates a symmetric pair of images around the center original image.

The renderer 112 uses the pixel-shift values calculated by the interpolator 110 to render one or more rendered images 114 based on the original images 102. Advantageously, the renderer converts abstract data (e.g., the pixel-shift parallax information) to a visual image based on the abstract data.

In some embodiments, the renderer 112 processes pixels of the original image based on the viewpoint of the image to be rendered. For example, if the viewpoint of the image to be rendered is left-of-center (where the original image is center), the renderer 112 processes the original image from left to right (e.g., pixels are processed row-by-row from the leftmost pixel to the rightmost pixel). If the viewpoint of the image to be rendered is to the right-of-center, the renderer 112 processes the original image from right to left. While some of the rendering examples described herein are carried out in a particular direction, one skilled in the art can appreciate that the direction used is exemplary only. The processing direction can depend on the viewpoint of the image to be rendered relative to the viewpoint of the original image.

The renderer 112 can process pixels according to various properties. For example, the renderer 112 can be configured to exploit the property that as a viewpoint of an image is moved to the left, more of the left side of the object becomes visible (the left side becomes unconcluded) and less of the right side of an object is visible (the right side becomes more occluded). When considering values on a depth matte to shift the original image to the left, the depth values often increase (come closer to a viewer) on the left side of objects and decrease (fall away from a viewer) on the right side of objects. The relative pixel-shift for a pair of neighboring pixels in an original image can therefore increase on the left side of an object, spreading the pixels further apart. Similarly, the relative pixel-shift for a pair of neighboring pixels compress towards the right side of the object, and may even reverse direction for a large right-side disparity. This is explained in further detail below with respect to FIGS. 3-4.

The generator 104 is an example of a computerized system that is specially configured to perform the computerized methods described herein. However, the system structure and content recited with regard to FIG. 1 are for exemplary purposes only and are not intended to limit other examples to the specific structure shown in FIG. 1. As is apparent to one of ordinary skill in the art, many variant system structures can be architected without departing from the computerized systems and methods described herein. In addition, information may flow between the elements, components and subsystems described herein using any technique. Such techniques include, for example, passing the information over the network using standard protocols, such as TCP/IP, passing the information between modules in memory and passing the information by writing to a file, database, or some other non-volatile storage device. In addition, pointers or other references to information may be transmitted and received in place of, or in addition to, copies of the information. Conversely, the information may be exchanged in place of, or in addition to, pointers or other references to the information. Other techniques and protocols for communicating information may be used without departing from the scope of the invention.

Figure 3:
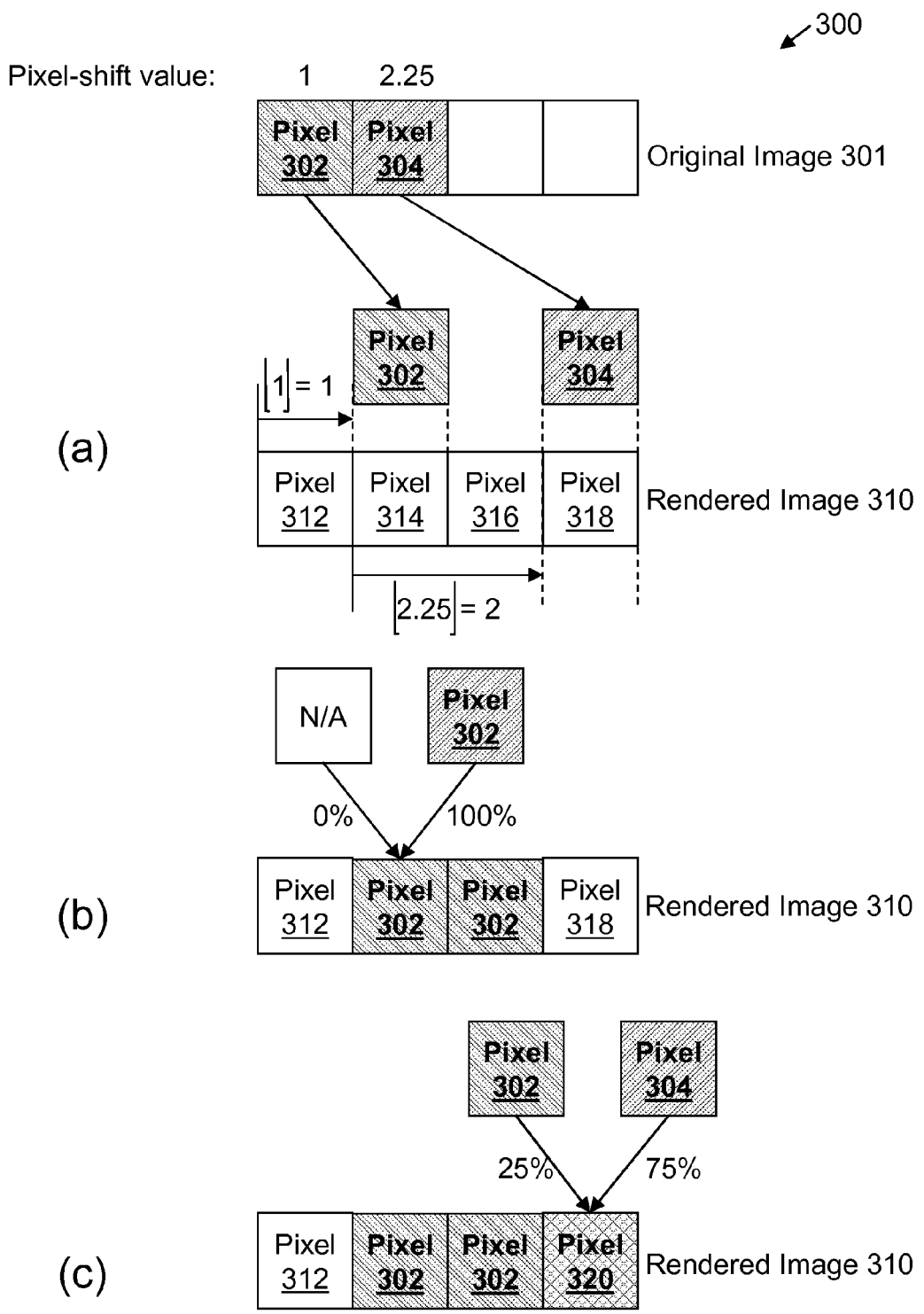
FIG. 3 is a diagram that illustrates a portion of an image being rendered from an original image according to an embodiment.

FIG. 3 is a diagram 300 that illustrates a portion of an image being rendered from an original image 301 according to an embodiment. The original image 301 (e.g., original image 102) includes a set of pixels (e.g., a grid of pixels), a portion of which is shown in FIG. 3 that includes pixels 302 and 304. Pixel 302 has a pixel-shift value of 1, and pixel 304 has a pixel-shift value of 2.25 (e.g., calculated by the interpolator 110 of FIG. 1). The image to be rendered 310 includes a set of pixels 312, 314, 316 and 318. The values of the pixels in the image to be rendered 310 are calculated by the renderer 112. The rendering process is described in conjunction with FIGS. 5-6 below.

Figure 4A:
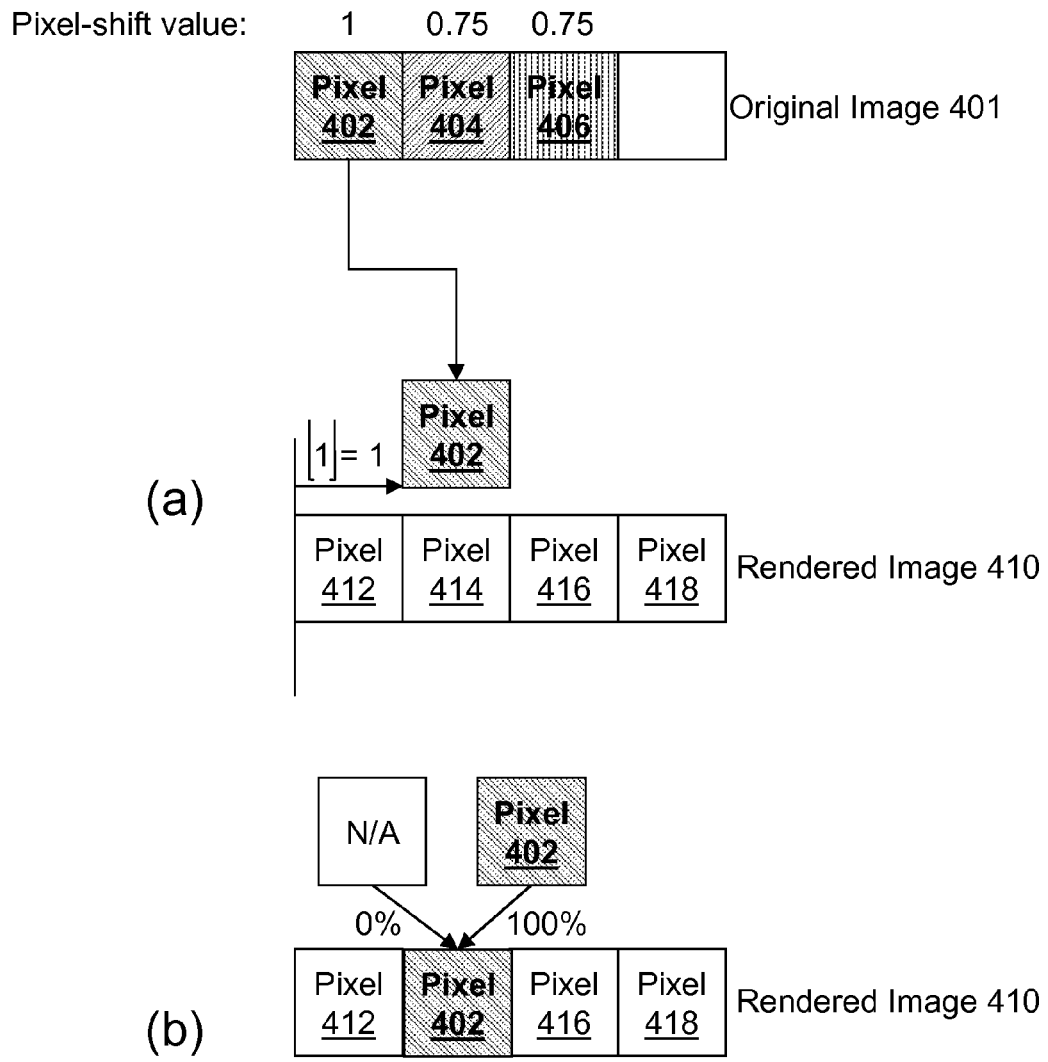
FIG. 4A is a diagram that illustrates a portion of an image being rendered from an original image according to an embodiment.
Figure 4B:
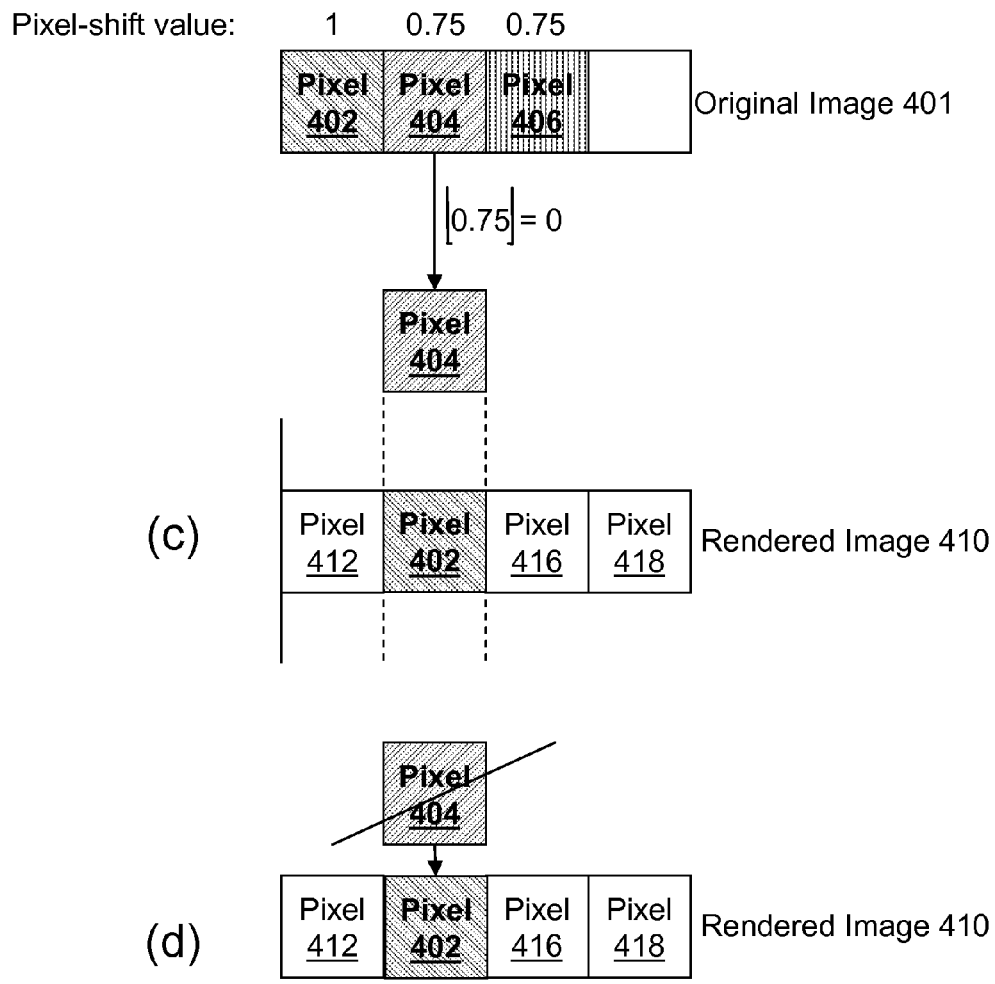
FIG. 4B is a diagram that illustrates a portion of an image being rendered from an original image according to an embodiment.
Figure 4C:
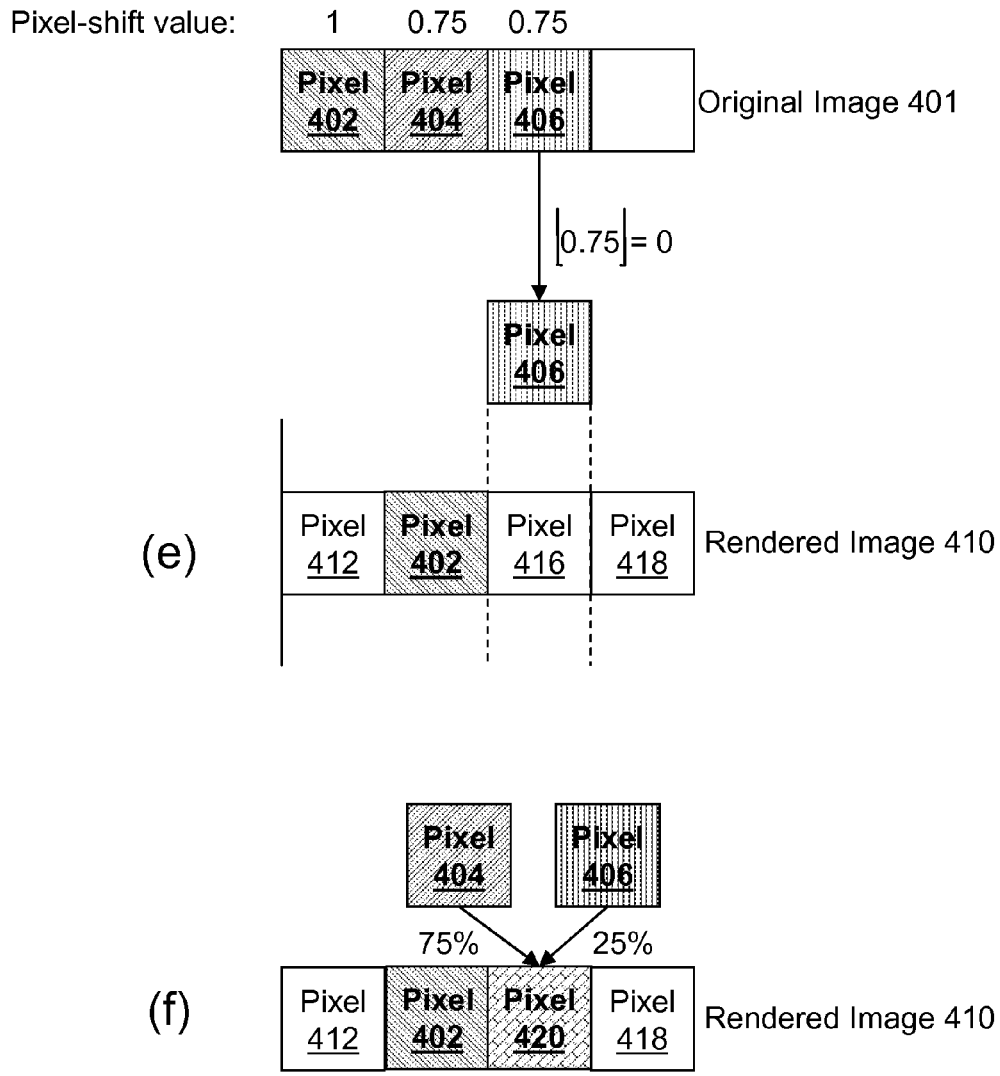
FIG. 4C is a diagram that illustrates a portion of an image being rendered from an original image according to an embodiment.

FIGS. 4A-4C (collectively referred to as FIG. 4) show a diagram 400 that illustrates a portion of an image being rendered from an original image 401 according to an embodiment. The original image 401 (e.g., original image 102) includes a set of pixels (e.g., a grid of pixels), a portion of which is shown in FIG. 4 that includes pixels 402, 404 and 406. Pixel 402 has a pixel-shift value of 1, pixel 404 has a pixel-shift value of 0.75, and pixel 406 has a pixel-shift value of 0.75. The image to be rendered 410 includes a set of pixels 412, 414, 416 and 418. The values of the pixels in the image to be rendered 410 are calculated by the renderer 112. The rendering process is described in conjunction with FIGS. 5-6 below.

Figure 5:
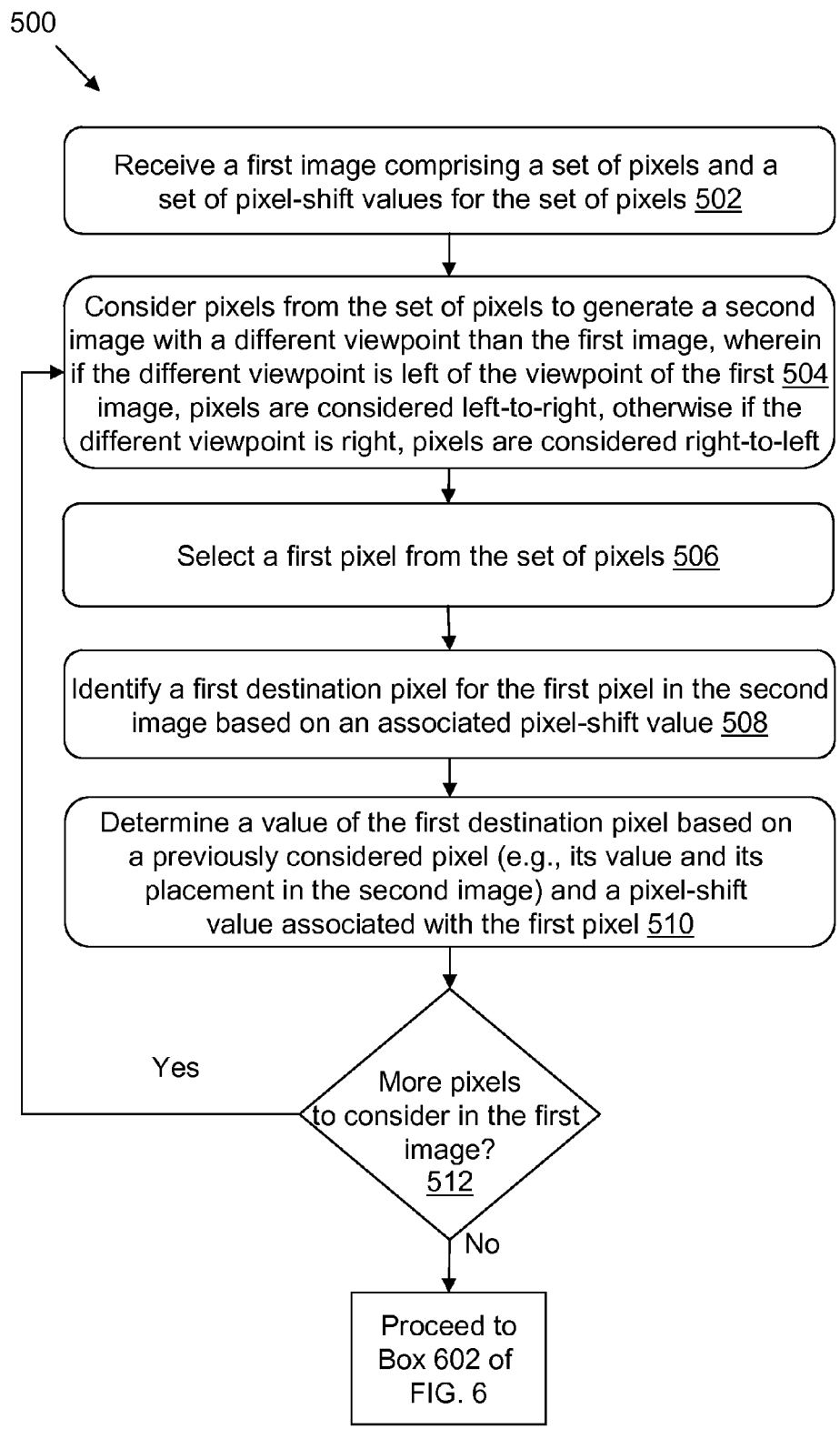
FIG. 5 is a flow diagram that illustrates a first pass of a rendering process according to an embodiment.

FIG. 5 is a flow diagram 500 that illustrates a first pass of a rendering process according to an embodiment. FIG. 5 is described in conjunction with FIGS. 1 and 3-4. Pixels from the original image are rendered based on the source pixels (e.g., the source pixel values, also referred to as the source pixel colors) and the pixel-shift values determined by the interpolator 110. In the first pass, the renderer 112 places pixels from the original image at their destination location in the rendered image, and fills small gaps, as is further described below.

At step 502, the generator 104 receives (a) a first image including a set of pixels (original images 301 and 401 in FIGS. 3 and 4, respectively) and (b) a set of pixel-shift values for the set of pixels. As described above, each pixel-shift value includes data indicative of a change in location of a corresponding pixel from the set of pixels from an original pixel location in the original image 102. At step 504, the renderer 112 considers pixels from the original images to generate a portion of a rendered image (e.g., rendered image 310 and 410 in FIGS. 3 and 4, respectively), the second image including a different viewpoint than a viewpoint of the first image.

At step 506, the renderer 112 selects a first pixel from the set of pixels based on the different viewpoint to render into the rendered image. If the different viewpoint of the rendered image is left of the viewpoint of the original image, the renderer 112 considers pixels in the set of pixels from the first image from left to right. If the different viewpoint of the second image is right of the viewpoint of the original image, the renderer 112 considers pixels in the set of pixels from the original image from right to left.

At step 508, the renderer 112 identifies a destination pixel for the first pixel in the rendered image (e.g., a pixel in the rendered image 310 or 410) based on a pixel-shift value from the set of pixel-shift values associated with the pixel being considered. At step 510, the renderer determines a value of the destination pixel based on at least one of (a) a previously considered pixel from the set of pixels of the original image that is horizontally adjacent to the first pixel or (b) the pixel-shift value associated with the first pixel. For example, as is described further with reference to FIGS. 3-4, the renderer 112 determines the value of the destination pixel for the pixel being considered based on a value of the previously considered pixel and a destination pixel for the previously considered pixel in the rendered image. The renderer 112 may not place each pixel in the rendered image, and may not even use each pixel from the original image (e.g., based on processing of the rendered image, the renderer 112 may discard the pixel).

Referring to step 506, the renderer 112 selects pixels from left to right in FIGS. 3 and 4 because the image to be rendered has a viewpoint left of the viewpoint of the original image. In other examples, the renderer 112 selects pixels from right to left if the rendered image's viewpoint is to the right of the original image. Referring to step 508, in some embodiments the renderer 112 identifies the first destination pixel based on an integer portion of the pixel-shift value associated with the pixel being considered. If the pixel-shift value for the pixel being considered is not an integer number, the renderer 112 determines the value of the first destination pixel based on (a) both the pixel being considered and the previously considered pixel and (b) a decimal portion of the pixel-shift value associated with the pixel being considered. If the pixel-shift value associated with the first pixel is an integer number, the renderer 112 sets the value of the destination pixel equal to the pixel being considered (e.g., the same color of the original pixel is placed at the destination pixel in the rendered image).

For example, referring to FIG. 3, the relative pixel-shift values for pixel 302 and 304 create a gap between the associated destination pixels 314 and 318 in the rendered image. This gap is indicative of the pixels becoming closer to the viewer in the rendered image 310. The renderer 112 processes the pixels in the original image 301 from left to right, and therefore begins by processing pixel 302. Pixel 302 has an associated pixel shift value of 1. The renderer identifies the destination pixel by mathematically calculating the floor of the pixel-shift value (i.e., truncating the number to only the integer portion of the pixel-shift value, and rounding down if there is any decimal portion to the pixel-shift value). As shown at (a) in FIG. 3, because the pixel shift value is an integer number, the render identifies pixel 314 in the rendered image 310 as the destination pixel for pixel 302, because it is located one pixel to the right of pixel 302's location in the original image 301. The renderer 112 determines whether it already calculated a rendered value for pixel 314. In FIG. 3, the renderer 314 has not yet calculated a value for pixel 314.

Therefore, the renderer 112 calculates value for the destination pixel 314 according to Equation 3:

$$V=(D \times P\_previous)+((1-D) \times P\_current) \qquad \text{Equation 3}$$

Where:
V=the value of the destination pixel;
P_current=the value of the pixel currently being considered;
P_previous=the value of the previously considered pixel; and
D=the decimal portion of the pixel-shift value for the pixel being considered.

Applying this equation at (b), since the pixel-shift value is an integer, the renderer 112 sets the value of pixel 314 equal to 100% of pixel 302. Further, since pixel 302 is the first pixel considered by the renderer, there is no Previous (which is indicated by N/A in FIG. 3)).

Referring back to (a), the renderer 112 next considers pixel 304. The renderer 112 calculates the floor of the pixel-shift value 2.25 for pixel 304, which equals 2. The renderer 112 identifies pixel 318 in rendered image 310 as the destination pixel for pixel 304 because it is two pixels to the right of the original pixel location of pixel 304. Referring to (b), the renderer 112 determines that there is a gap between destination pixel 314 (for pixel 302) and destination pixel 318 (for pixel 304), which includes one pixel, pixel 316. The renderer 112 determines whether the pixel gap is below a predetermined threshold gap size (e.g., which is stored in database 108). At (b), the renderer 112 determines the pixel gap is less than a threshold gap size (e.g., 1 is less than the threshold gap size of 10), and sets the pixel value for each pixel in the set of pixels of the pixel gap (which is only pixel 316) equal to the previously considered pixel 302. If the renderer 112 had determined the pixel gap was greater than the threshold gap size, the renderer 112 would not fill the gap and instead would wait to fill the gap until the second pass (e.g., as described in reference to FIG. 6).

Referring to (c), the renderer 112 calculates the value for destination pixel 318. The renderer 112 determines the decimal portion of the pixel-shift value for pixel 304, which is 0.25, or 25%. The renderer 112 next calculates the value for pixel 318 using Equation 3, where V=(D.times.P_previous)+((1−D).times.P_current)=(0.25.times.pixel 302)+(0.75.times.pixel 304)=pixel 320.

Referring to step 510 of FIG. 5, in some embodiments the renderer 112 determines the value of the destination pixel for the pixel being considered was previously determined based on the previously considered pixel. Therefore, the previously considered pixel had a larger shift than a shift of the pixel being considered, which caused the previous pixel to overlap with the current pixel. Because of this overlap, the renderer 112 does not change the value of the destination pixel based on the currently considered pixel. Such an overlap can occur, when in the rendered image the previously considered pixel is closer to a viewer than the first pixel such that the previously considered pixel obscures the first pixel from the viewer.

If there is an overlap, even though the renderer 112 does not change the destination pixel value based on the obscured pixel, the obscured pixel can be used to determine the value of the destination pixel for the next considered pixel. For example, the renderer 112 evaluates the next pixel from the original image, which is horizontally adjacent to the obscured pixel and the previously considered pixel. The renderer 112 identifies a destination pixel for the next pixel in the rendered image based on an associated pixel-shift value from the set of pixel-shift values, wherein the destination pixel is horizontally adjacent to the destination pixel of the previously considered pixel. The renderer 112 sets a value of the destination pixel based on the obscured pixel, the next pixel, and the pixel-shift value associated with the next pixel.

For example, in FIG. 4A, the renderer 112 first considers pixel 402 for rendering into rendered image 410. At (a), because the pixel shift value is an integer number, the renderer identifies pixel 414 in the rendered image 410 as the destination pixel for pixel 402, because it is located one pixel to the right of pixel 402's location in the original image 401. The renderer 112 applies Equation 3 at (b) in FIG. 4A to determine the value of destination pixel 414. Since the pixel-shift value for pixel 402 is an integer value 1, the renderer 112 sets the value of pixel 414 equal to 100% of pixel 402. Further, since pixel 402 is the first pixel considered by the renderer, there is no P_previous (which is indicated by N/A in FIG. 4A)).

As shown in FIG. 4B, the renderer 112 next considers pixel 404 (which is horizontally adjacent to pixel 402). The floor of the pixel-shift value 0.75 for pixel 404 is 0. At (c), because the renderer 112 uses the value 0 to determine the destination pixel for pixel 404, the renderer again identifies pixel 414 in the rendered image 410 because it is located at the same location as pixel 404 in the original image 401. At (d), the renderer 112 next determines the value of pixel 414 was already calculated (e.g., based on pixel 402 as described in FIG. 4A). Because the renderer 112 already calculated a value for pixel 414, the renderer 112 does not change the value of pixel 414 (which was set to the value of pixel 402), and progressively considers the next pixel as shown in FIG. 4C.

In FIG. 4C, the renderer 112 next considers pixel 406 (which is horizontally adjacent to pixel 404). The floor of the pixel-shift value 0.75 for pixel 406 is 0. At (e), because the renderer 112 uses the value 0 to determine the destination pixel for pixel 406, the mer identifies pixel 416 in the rendered image 410 because it is located at the same location as pixel 406 in the original image 401. The renderer 112 applies Equation 3 at (f) to determine the value of destination pixel 416. Since the pixel-shift value for pixel 406 is 0.75, the renderer 112 calculates the value V=(D.times.P_previous)+((1−D).times.P_current)=(0.75.times.pixel 404)+(0.25.times.pixel 406)=pixel 420.

In some embodiments, the renderer 112 keeps track of the top-most rendered pixel. For a rendered image with a viewpoint left of the original image, the top-most pixel is the right-most destination pixel. In a steeply receding rendered image, if the renderer 112 determines a new destination pixel is to the left of the top pixel, the renderer 112 does not perform any operations on the rendered image for the pixel being analyzed. For example, referring to FIG. 4B, the top-most rendered pixel was pixel 414. Because the renderer 112 identified the destination pixel 414 for both pixels 402 and 404, pixel 404 is rendered "behind" pixel 402. The renderer 112 does not perform any operations on the rendered image 410 for pixel 404. Advantageously, the renderer 112 can computationally save time by not needing to compare the actual depth of pixels 402 and 404 when rendering the image 410. Similarly, if any other pixels form the original image 401 have destination pixels that are either behind or to the left of pixel 414 (e.g., at destination pixel 412), the renderer 112 simply does not perform any operations based on the associated pixels from the original image 401. The top-most pixel is not determined based on depth information (e.g., whether it is close or far from the viewer), but is determined through the pixel placement process which has already incorporated depth in the determination of the pixel-shift value(s).

Figure 6:
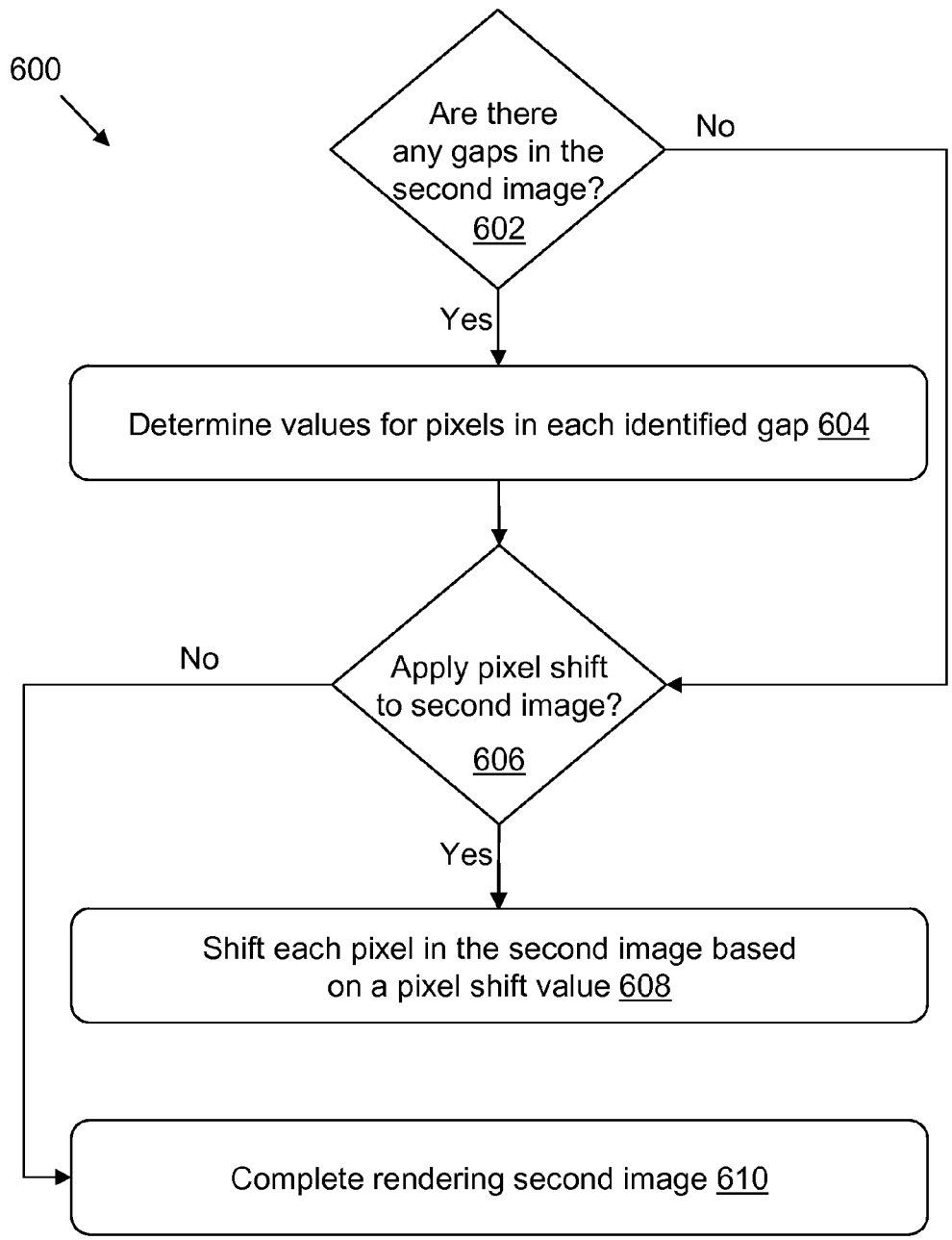
FIG. 6 is a flow diagram that illustrates a second pass of a rendering process according to an embodiment.

FIG. 6 is a flow diagram 600 that illustrates a second pass of a rendering process according to an embodiment. In the second pass, the renderer 112 can fill pixels of any gaps that were larger than the threshold gap size, and perform additional processing of the image (e.g., unconcluded areas in the rendered image that were not filled in the first pass). At step 602, the renderer 112 identifies the set of pixel gaps in the second image that were greater than the threshold gap size. These pixel gaps represent newly revealed areas of objects or other items in the original image that need to be filled. At step 604, the renderer 112 determines values for pixels in each pixel gap. One skilled in the art can appreciate there are various methods the renderer 112 can use to fill these large pixel gaps. For example, the depth of the two pixels at either end of a pixel gap can be compared and the intermediate pixels can be filled with the pixel value of the lower (further away) pixel. In some embodiments, the actual depth of the pixels need not be considered. For example, if an original image is being processed left-to-right, the pixel at the left adjacency may be lower. If an original image is being processed right-to-left, the pixel at the right adjacency may be lower.

At step 606, the renderer 112 determines whether to apply a pixel shift to the rendered image. If, for example, the renderer 112 receives data indicative of a pixel shift value for the rendered image, at step 608 the renderer 112 shifts each pixel in the rendered image based on the pixel shift value (e.g., the entire rendered image is shifted by 2, −1, etc.). The shift can be, for example, a constant horizontal shift (e.g., a Horizontal Image Translation (HIT)). In some embodiments, the shift is incorporated into the pixel-shift value calculations. At step 610 the renderer 112 outputs the rendered image(s).

Figure 7:
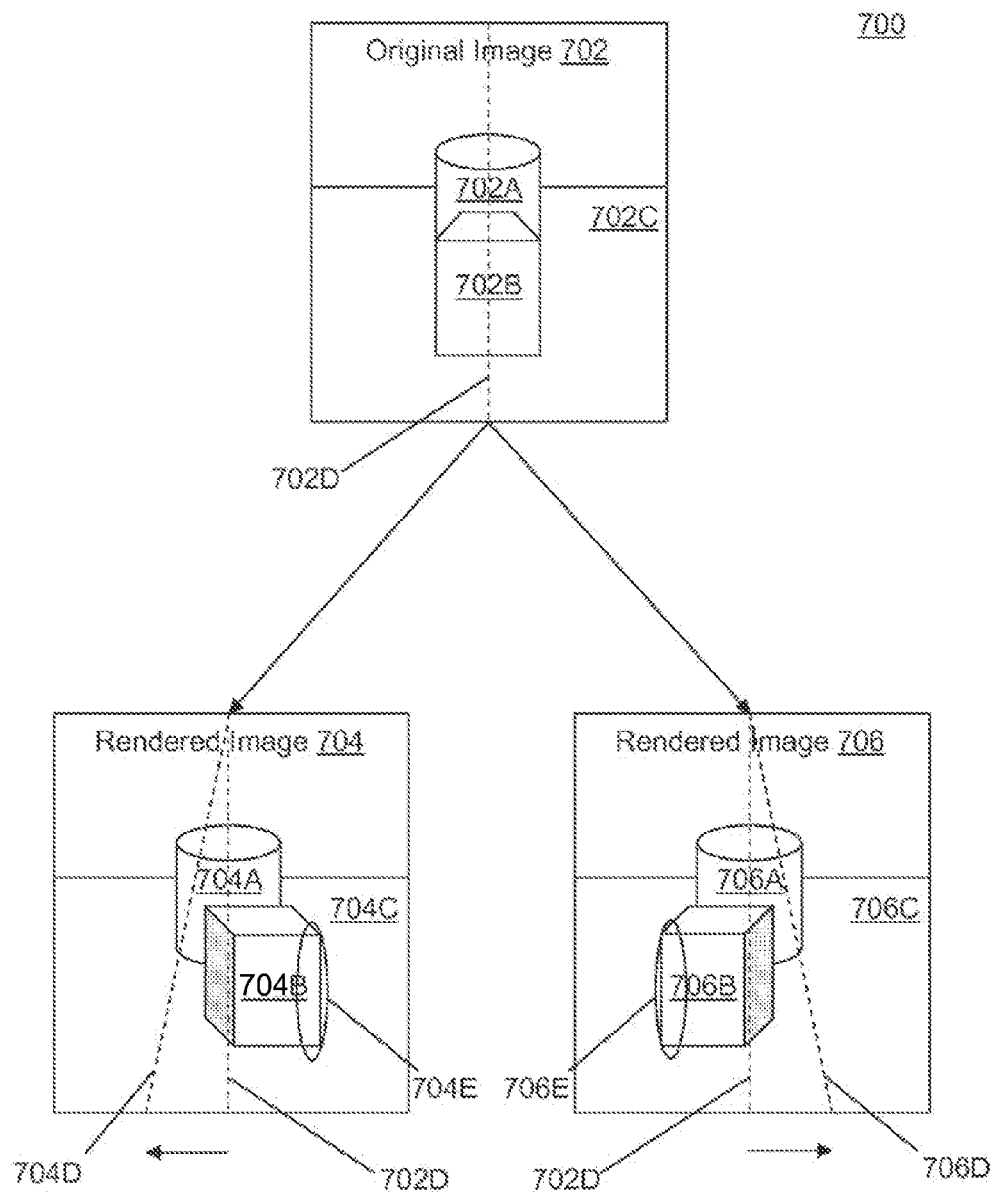
FIG. 7 is a diagram that illustrates an original image and two rendered images generated from the original image according to an embodiment.

FIG. 7 is a diagram 700 that illustrates an original image 702 and two rendered images 704, 706 generated from the original image according to an embodiment. Original image 702 includes object one 702A (a cylinder), object two 702B (a square), and object three 702C (a table on which objects 702A and 702B are stationary). Original image 702 is taken from viewpoint 702D.

Rendered image 704 is taken from a viewpoint 704D, which is left of the viewpoint 702D of the original image 702. Rendered image 704 includes different viewpoints of object one 702A (shown as 704A), object two 702B (shown as object 704B) and object three 702C (shown as object 704C). As can be seen in rendered image 704, because the viewpoint 704D is left of the original viewpoint 702D, objects shift to the right of the image. For example, object two 704B is now located more right than object two 702B in the original image 702, which exposes the left side of object 704B. Because object two 704B shifted right, the portions of original object 702C that were immediately to the right of object 702B in the original image 702 are now hidden. Advantageously, by rendering pixels from the original image 702 from left-to-right since the rendered image 704 has a viewpoint 704D left of viewpoint 702D, the renderer 112 can keep track of the top pixels of object two 704B (e.g., on the front face of object 704B). When pixels from object three 704C would be drawn to the left of the top pixels (e.g., the pixels of object 704C that now fall behind portion 704E of object 704B), the renderer 112 can easily discard these pixels without comparing the actual depth of the pixels of objects two 704B and three 704C.

Rendered image 706 is taken from a viewpoint 706D, which is right of the viewpoint 702D of the original image 702. Rendered image 704 includes different viewpoints of object one 702A (shown as 706A), object two 702B (shown as object 706B) and object three 702C (shown as object 706C). As can be seen in rendered image 706, because the viewpoint 706D is right of the original viewpoint 702D, objects shift to the left of the image. For example, object two 706B is now located more left than object two 702B in the original image 702, which exposes the right side of object 706B. Because object two 706B shifted left, the portions of original object 702C that were immediately to the left of object 702B in the original image 702 are now hidden. Advantageously, by rendering pixels from the original image 702 from right-to-left since the rendered image 706 has a viewpoint 706D right of viewpoint 702D, the renderer 112 can keep track of the top pixels of object two 706B (e.g., on the front face of object 706B). When pixels from object three 706C would be drawn to the right of the top pixels (e.g., the pixels of object 706C that now fall behind portion 706E of object 706B), the renderer 112 can easily discard these pixels without comparing the actual depth of the pixels of objects two 706B and three 706C.

The generator 104 generates rendered images 704 and 706 based on, for example, the original image 702 and a depth matte for original image 702. For example, the interpolator 110 generates a set of pixel-shift values for the pixels in the original image 702 that the renderer 112 uses to render the rendered image 704. The renderer 112 can reverse the pixel-shift values and use the reversed pixel-shift values to render the rendered image 706.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit). Subroutines can refer to portions of the computer program and/or the processor/special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage devices suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The computing system can include clients and servers. A client and a server are generally remote from each other and typically interact through a communication network. The relationship of client and server arises by virtue of computer programs running on the respective computers and having a client-server relationship to each other.

The components of the computing system can be interconnected by any form or medium of digital or analog data communication (e.g., a communication network). Examples of communication networks include circuit-based and packet-based networks. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

Devices of the computing system and/or computing devices can include, for example, a computer, a computer with a browser device, a telephone, an IP phone, a mobile device (e.g., cellular phone, personal digital assistant (PDA) device, laptop computer, electronic mail device), a server, a rack with one or more processing cards, special purpose circuitry, and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). A mobile computing device includes, for example, a Blackberry®. IP phones include, for example, a Cisco® Unified IP Phone 7985G available from Cisco System, Inc, and/or a Cisco® Unified Wireless Phone 7920 available from Cisco System, Inc.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A computerized method comprising:
    receiving, by a computing device, (a) a first image comprising a set of pixels and (b) a set of pixel-shift values for the set of pixels, each pixel-shift value comprising data indicative of a change in location of a corresponding pixel from the set of pixels from an original pixel location in the first image; and
    receiving, by an input unit of a computer, a first two dimensional image and a second two dimensional image, each two dimensional image comprising a pixel size;
    generating, by the computing device, a portion of a second image, the second image comprising a different viewpoint than a viewpoint of the first image, comprising:
        selecting, by the computing device, a first pixel from the set of pixels based on the different viewpoint;
        identifying, by the computing device, a first destination pixel for the first pixel in the second image based on a pixel-shift value from the set of pixel-shift values associated with the first pixel;
    determining, by the computing device, a value of the first destination pixel based on at least one of (a) a previously considered pixel from the set of pixels of the first image that is horizontally adjacent to the first pixel or (b) the pixel-shift value associated with the first pixel;
    determining the value of the first destination pixel was previously determined based on the previously considered pixel, the previously considered pixel having a larger shift than a shift of the first pixel;
    not changing the value of the first destination pixel based on the first pixel;
    selecting a second pixel that is horizontally adjacent to the first pixel and the previously considered pixel;
    identifying a second destination pixel for the second pixel in the second image based on an associated pixel-shift value from the set of pixel-shift values, wherein the second destination pixel is horizontally adjacent to the first destination pixel; and
    setting a value of the second destination pixel based on the first pixel, the second pixel, and the pixel-shift value associated with the second pixel.

2. The method of claim 1, wherein determining comprises determining the value of the first destination pixel based on a value of the previously considered pixel and a destination pixel for the previously considered pixel in the second image.

3. The method of claim 1, wherein the different viewpoint of the second image is left of the viewpoint of the first image, the method further comprising considering pixels in the set of pixels from the first image from left to right.

4. The method of claim 1, wherein the different viewpoint of the second image is right of the viewpoint of the first image, the method further comprising considering pixels in the set of pixels from the first image from right to left.

5. The method of claim 1, wherein determining the value of the first destination pixel comprises:
    determining a pixel gap between the first destination pixel and a destination pixel of the previously considered pixel, the gap comprising a set of pixels; and
    if the pixel gap is less than a threshold gap size, setting the pixel value for each pixel in the set of pixels of the pixel gap equal to the previously considered pixel.

6. The method of claim 1, wherein:
    identifying the first destination pixel comprises identifying the first destination pixel based on an integer portion of the pixel-shift value associated with the first pixel; and
    determining the value of the first destination pixel comprises determining the value based on (a) both the first pixel and the previously considered pixel and (b) a decimal portion of the pixel-shift value associated with the first pixel.

7. The method of claim 1, wherein the pixel-shift value associated with the first pixel is an integer number, and determining comprises setting the value of the first destination pixel equal to the first pixel.

8. The method of claim 1, wherein the previously considered pixel is closer to a viewer than the first pixel such that the previously considered pixel obscures the first pixel from the viewer.

9. The method of claim 1 comprising:
    identifying a set of pixel gaps in the second image, wherein each pixel gap in the set of pixel gaps is greater than a threshold gap size; and
    determining values for pixels in each pixel gap of the set of pixel gaps.

10. The method of claim 9 comprising:
    selecting a pixel gap from the set of pixel gaps;
    determining which of a left pixel horizontally adjacent to a left side of the pixel gap and a right pixel horizontally adjacent to a right side of the pixel gap has a lowest depth based on the different viewpoint; and
    determining values for pixels in the pixel gap based on the lowest of the left pixel and the right pixel.

11. The method of claim 1, further comprising:
    receiving data indicative of a pixel shift value for the second image; and
    shifting each pixel in the second image based on the pixel shift value.

12. The method of claim 1, wherein the set of pixel-shift values are calculated based on depth information for the set of pixels of the first image.

13. The method of claim 12, wherein the depth information comprises a depth matte comprising a depth value for each pixel in the first image.

14. An apparatus comprising a processor and memory configured to:
    receive (a) a first image comprising a set of pixels and (b) a set of pixel-shift values for the set of pixels, each pixel-shift value comprising data indicative of a change in location of a corresponding pixel from the set of pixels from an original pixel location in the first image; and generate a portion of a second image, the second image comprising a different viewpoint than a viewpoint of the first image, comprising:
  selecting a first pixel from the set of pixels based on the different viewpoint;
  identifying a first destination pixel for the first pixel in the second image based on a pixel-shift value from the set of pixel-shift values associated with the first pixel; and
  determining a value of the first destination pixel based on at least one of (a) a previously considered pixel from the set of pixels of the first image that is horizontally adjacent to the first pixel or (b) the pixel-shift value associated with the first pixel;
  determining the value of the first destination pixel was previously determined based on the previously considered pixel, the previously considered pixel having a larger shift than a shift of the first pixel;
  not changing the value of the first destination pixel based on the first pixel;
  selecting a second pixel that is horizontally adjacent to the first pixel and the previously considered pixel;
  identifying a second destination pixel for the second pixel in the second image based on an associated pixel-shift value from the set of pixel-shift values, wherein the second destination pixel is horizontally adjacent to the first destination pixel; and
  setting a value of the second destination pixel based on the first pixel, the second pixel, and the pixel-shift value associated with the second pixel.

15. A computer program product, tangibly embodied in a non-transitory computer readable medium, the computer program product including instructions being configured to cause a data processing apparatus to:
  receive (a) a first image comprising a set of pixels and (b) a set of pixel-shift values for the set of pixels, each pixel-shift value comprising data indicative of a change in location of a corresponding pixel from the set of pixels from an original pixel location in the first image; and
  generate a portion of a second image, the second image comprising a different viewpoint than a viewpoint of the first image, comprising:
    selecting a first pixel from the set of pixels based on the different viewpoint;
    identifying a first destination pixel for the first pixel in the second image based on a pixel-shift value from the set of pixel-shift values associated with the first pixel; and
    determining a value of the first destination pixel based on at least one of (a) a previously considered pixel from the set of pixels of the first image that is horizontally adjacent to the first pixel or (b) the pixel-shift value associated with the first pixel;
    determining the value of the first destination pixel was previously determined based on the previously considered pixel, the previously considered pixel having a larger shift than a shift of the first pixel;
    not changing the value of the first destination pixel based on the first pixel;
    selecting a second pixel that is horizontally adjacent to the first pixel and the previously considered pixel;
    identifying a second destination pixel for the second pixel in the second image based on an associated pixel-shift value from the set of pixel-shift values, wherein the second destination pixel is horizontally adjacent to the first destination pixel; and
    setting a value of the second destination pixel based on the first pixel, the second pixel, and the pixel-shift value associated with the second pixel.

16. An apparatus comprising a means for:
  receiving (a) a first image comprising a set of pixels and (b) a set of pixel-shift values for the set of pixels, each pixel-shift value comprising data indicative of a change in location of a corresponding pixel from the set of pixels from an original pixel location in the first image; and
  generating a portion of a second image, the second image comprising a different viewpoint than a viewpoint of the first image, comprising:
    selecting a first pixel from the set of pixels based on the different viewpoint;
    identifying a first destination pixel for the first pixel in the second image based on a pixel-shift value from the set of pixel-shift values associated with the first pixel; and
    determining a value of the first destination pixel based on at least one of (a) a previously considered pixel from the set of pixels of the first image that is horizontally adjacent to the first pixel or (b) the pixel-shift value associated with the first pixel;
    determining the value of the first destination pixel was previously determined based on the previously considered pixel, the previously considered pixel having a larger shift than a shift of the first pixel;
    not changing the value of the first destination pixel based on the first pixel;
    selecting a second pixel that is horizontally adjacent to the first pixel and the previously considered pixel;
    identifying a second destination pixel for the second pixel in the second image based on an associated pixel-shift value from the set of pixel-shift values, wherein the second destination pixel is horizontally adjacent to the first destination pixel; and
    setting a value of the second destination pixel based on the first pixel, the second pixel, and the pixel-shift value associated with the second pixel.

* * * * *